United States Patent [19]

Fujita

[11] 4,326,255

[45] Apr. 20, 1982

[54] APPARATUS FOR CONTROLLING PLASTICIZING PROCESS OF IN-LINE SCREW-TYPE INJECTION MOLDING MACHINE

[75] Inventor: Shigeru Fujita, Numazu, Japan

[73] Assignee: Toshiba Kikai Kabushiki Kaisha, Tokyo, Japan

[21] Appl. No.: 231,214

[22] Filed: Feb. 2, 1981

Related U.S. Application Data

[63] Continuation-in-part of Ser. No. 28,552, Apr. 9, 1979, abandoned.

[30] Foreign Application Priority Data

| Apr. 13, 1978 | [JP] | Japan | 53-43575 |
| Apr. 27, 1978 | [JP] | Japan | 53-50572 |
| Jun. 19, 1978 | [JP] | Japan | 53-73939 |
| Jun. 19, 1978 | [JP] | Japan | 53-73940 |

[51] Int. Cl.³ .............. B29F 1/06; G06F 7/66
[52] U.S. Cl. .............. 364/476; 264/40.1; 425/145
[58] Field of Search .............. 364/476; 425/141, 142, 425/143, 144, 145, 149; 264/40.1

[56] References Cited

U.S. PATENT DOCUMENTS

| 3,728,058 | 4/1973 | Wheeler | 425/144 |
| 3,767,339 | 10/1973 | Hunkar | 425/145 |
| 3,822,057 | 7/1974 | Wheeler | 425/145 X |
| 3,860,801 | 1/1975 | Hunkar | 364/476 |
| 3,870,445 | 3/1975 | Hold et al. | 425/145 X |
| 3,904,078 | 9/1975 | Neff et al. | 425/145 X |
| 3,920,367 | 11/1975 | Ma et al. | 364/476 X |
| 3,932,083 | 1/1976 | Boettner | 425/145 |
| 3,941,534 | 3/1976 | Hunkar | 425/145 |
| 4,222,725 | 9/1980 | Rodgers, Jr. | 425/145 |

Primary Examiner—Felix D. Gruber
Attorney, Agent, or Firm—Koda and Androlia

[57] ABSTRACT

In apparatus for controlling a plasticizing process of a resin of an in-line screw-type injection molding machine, a position of the screw is continuously detected in accordance with the movement thereof and a control function is determined on the basis of one of various factors, such as resin heating energy, shearing energy, injection pressure and filling speed, which determine a temperature distribution of a resin to be injected. The operating condition, particularly the number of revolutions and the back pressure of the screw, is controlled on the basis of the control function and the screw position so as to uniformalize the temperature distribution of the resin.

5 Claims, 15 Drawing Figures

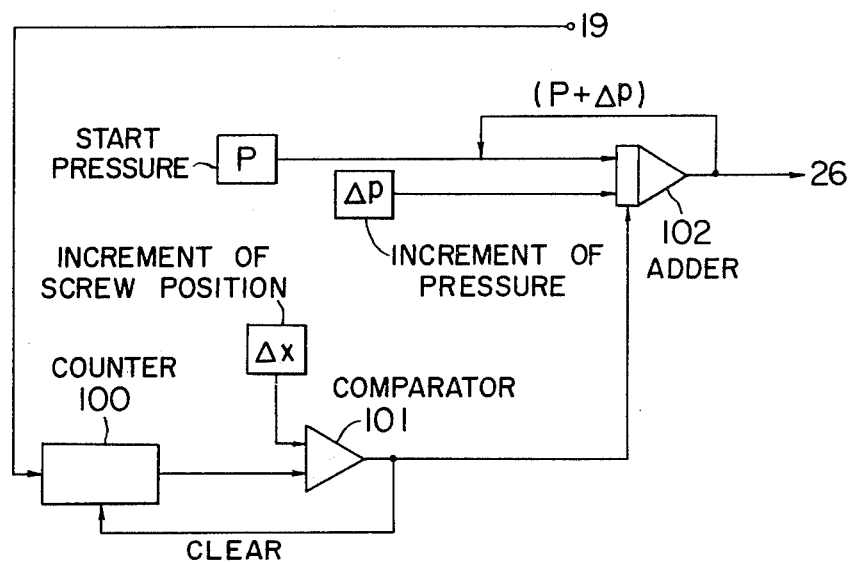

APPARATUS FOR CONTROLLING PLASTICIZING PROCESS OF IN-LINE SCREW-TYPE INJECTION MOLDING MACHINE

This application is a continuation-in-part of my copending application Ser. No. 2,8552 filed Apr. 9, 1979, now abandoned.

BACKGROUND OF THE INVENTION

This invention relates to apparatus for controlling a plasticizing process of an in-line screw-type injection molding machine so as to obtain an injection molded product having uniform quality by uniformly controlling the temperature of a material such as resins to be molded.

In a prior art injection molding process using an in-line screw-type injection molding machine, there have been proposed various methods and apparatus to obtain an injection molded product having uniform quality by controlling a plasticizing process by changing the number of revolutions and/or back pressure of the screw of an injection molding machine.

However, in a prior art injection molding machine, the temperature and the viscosity of the melted material such as resins are not controlled or controlled by presetting programs regarding the number of revolutions and/or the back pressure of the screw after the completion of the plasticizing process and it has been difficult to obtain a molded product having highly uniform quality, for example, in view of the fact that melted resin prepared in one plasticizing cycle is not always used for one injection process. The non-uniform quality of the product may result in cracks and spoil the appearance of the product.

Thus, in order to obtain an injection molded product having uniform quality, it is necessary to strictly control or amend such factors, in the plasticizing or injection process, as heating temperature, shearing energy caused by the rotation of the screw, back pressure and the rotating speed of the screw for the reasons described in detail hereunder.

Generally, in an in-line screw-type injection molding machine, a material, usually a resin, supplied into a heating chamber from a hopper is melted by heating energy generated by a heater and shearing energy caused by the rotation of the screw arranged in a heating chamber.

The heating energy is applied to the resin in proportion to the time when the resin exists in the heating cylinder, and the heating time is determined on the basis of the correlation between all amount of the resin B' existing in the screw threads at a time when the screw moves backwardly by a distance of a measuring stroke necessary for the molding after the completion of a measuring process and an amount of resin A' necessary for manufacturing one molded product. A ratio B'/A' is generally equal to $N' + \alpha$ (N': integer; $0 < \alpha < 1$). In this equation, where $\alpha = 0$, all of the raw material resin supplied into the heating cylinder in one plasticizing process is injected after N' molding cycles (this is the case where the amount of the resin in a portion of the heating cylinder corresponding to "5a" in FIG. 4 equals to zero), and the resin to be injected by one injection process from the heating cylinder is subjected to the uniform heat energy in the cylinder. In this case, there is no problem, but a case wherein $\alpha = 0$ is considerably rare and where $\alpha \neq 0$, a certain amount of resin remains in the hopper after N' shots and this remaining resin will be mixed with a material resin fed by the next measuring process. The resin fed into a space defined at the front end of the heating cylinder consists of two portions. One portion is a portion of the resin fed into the heating cylinder in the former molding cycle (5a in FIG. 4) and the other is a portion of the resin fed therein in the next molding cycle (5b in FIG. 4). Thus, there exist resins having different temperatures and/or viscosities in the heating cylinder, and a molded product made of these resins has such defects as forming of flow marks, roughness of the surface and non-uniform strength.

From another point of view, the resin supplied from the hopper is melted in the heating cylinder by the heat energy generated by a heater and the shearing energy caused by the rotation of the screw. The shearing energy is increased in proportion to the effective length of the screw at a time when the resin which has already been supplied from the hopper into the space between the screw threads is fed into a space formed at the front end of the heating cylinder to temporarily accumulate the melted resin before the injection process. The effective screw length momentarily varies for the reason that the screw is backwardly moved during the resin measuring process. Therefore, even the resin supplied in one measuring process is subjected to shearing energies which are different at the various portions of the resin and the temperature of the resin fed into the space formed at the front end of the heating cylinder is not uniform.

From still another point of view, the temperature of the melted resin is generally increased by applying pressure, and accordingly, in an in-line screw-type injection molding machine, the temperature of the resin between the screw threads is caused to change by the increase of the pressure in a process of filling the resin into the mold cavity. Therefore, even if the temperature of the resin in the heating cylinder after the plasticizing process were uniform, the temperature would become non-uniform in the subsequent filling process by the increase of the pressure. Thus, the resin to be injected has a non-uniform distribution of temperature.

From the other point of view, the temperature of the melted resin in the filling process is caused to change by the change of the shearing energy caused by the change of the flow speed of the melted resin. The change of the shearing energy cannot be ignored because there are some members having relatively narrow cross-section such as a nozzle, a runner and a gate in the flow path of the resin so that the shearing energy is affected by these members.

For example, FIG. 1 shows a graph representing the relation between the injection ratio and the temperature ratio of a resin such as polyethylene or polystyrene molded through a nozzle having an inner diameter of 3 mm. In the graph, the temperature ratio "1" shows the temperature in a case where the injection ratio is 100 cm³/sec. The correlation between the injection ratio, i.e., the filling speed, namely the shearing energy, and the temperature ratio can be understood from this graph.

Particularly, in an injection molding machine in which a program of the resin filling speed is controlled, the flow speed is positively varied in the filling process, so that the shearing energy generated during this process largely varies and the resin filled in the mold cavity has a temperature distribution in proportion to the resin filling speed. Therefore, even if the temperature of the resin plasticized in the heating cylinder were uniformly controlled after the measuring process has been completed, the temperature of the resin would become non-uniform by the effect of the shearing energy during the filling process after the measuring process for the reason described before. However, the program control of the filling speed of the melted resin which results in the variation of the temperature of the resin must be carried out so that the flow of the resin would not be uniform in the mold cavity. Particularly, since the mold cavity comprises portions having relatively large and small cross-sections and the flow speeds of the resin are different at respective portions, the flow speed is program controlled so that the resin would flow at a high speed at a portion having large cross-section and at a low speed at a portion having small cross-section. However, in view of the shearing energy at the nozzle portion, a molded product will have a higher temperature in thick portions and a low temperature in thin portions. Thus, when the molded product is cooled, the temperature distribution further varies largely thus damaging the molded product.

SUMMARY OF THE INVENTION

Accordingly, a principal object of this invention is to obtain a molded product having uniform quality with an in-line screw-type injection molding machine.

Another object of this invention is to provide apparatus for controlling a plasticizing or an injection process of the in-line screw-type injection molding machine to obtain products molded at a uniform temperature.

A further object of this invention is to provide apparatus for controlling a plasticizing process so as to make uniform the heat energy to be applied to a raw material resin throughout the measuring process by controlling the number of revolutions and the back pressure of the screw of the in-line screw type injection molding machine.

A still another object of this invention is to provide apparatus for controlling a plasticizing process so as to make uniform the shearing energy to be applied to a raw material resin throughout the process by controlling the number of revolutions and the back pressure of the screw of the in-line screw-type injection molding machine.

Yet another object of this invention is to provide apparatus for controlling a plasticizing process for compensating for the variation of the resin injection pressure during a resin filling process by controlling the number of revolutions and the back pressure of the screw in the measuring process of an in-line screw-type injection molding machine.

Another object of this invention is to provide apparatus for controlling a plasticizing process so as to make uniform the shearing energy to be applied to the resin in accordance with a programmed resin filling speed throughout the process by controlling the number of revolutions and the back pressure in the measuring process of an in-line screw-type injection molding machine.

According to this invention, in one aspect, there is provided apparatus for controlling a plasticizing process of a resin of an in-line screw-type injection molding machine of the type in which the number of revolutions and the back pressure of a screw disposed in a heating cylinder of the injection molding machine are controlled during the resin plasticizing process and comprising hydraulic means for reciprocating and rotating said screw, means for detecting a process variable which represents a position of the screw during the plasticizing process, memory means in which are set programs regarding the number of revolutions and the back pressure of the screw in first and second steps of a resin measuring process, and an operation controller responsive to the output of the detecting means for controlling and determining a control function regarding an operating condition for uniformarizing the resin to be injected so as to compensate for the distribution of the temperature of the resin, wherein the apparatus comprises a measuring stroke setting device and a cushion amount setting device which are set in accordance with the quantity of a product to be formed, an operational circuit for determining a point between the first and second steps from values set in the measuring stroke setting device and the cushion amount setting device, a comparator which compares an output signal from the operational circuit with that from the detecting means, and switching means which are operated by an output signal from the comparator for controlling the hydraulic means in accordance with the predetermined programs stored in the memory means thereby to control the number of revolutions and the back pressure of the screw.

In one modification of this invention, there is provided apparatus for controlling a plasticizing process of a resin of an in-line screw-type injection molding machine of the type in which the number of revolutions and back pressure of a screw disposed in a heating cylinder of the injection molding machine are controlled during the resin plasticizing process, and wherein an injection pressure is varied at predetermined points of the screw at which resin filling stroke is divided.

In another modification of this invention, there is provided apparatus for controlling a plasticizing process of a resin of an in-line screw-type injection molding machine of the type described above, and wherein the resin filling stroke is divided into several regions at which resin filling speed is controlled.

BRIEF DESCRIPTION OF THE DRAWINGS

In the accompanying drawings:

FIG. 15 shows a schematic block diagram of one part of an operating condition setting device.

DESCRIPTION OF THE PREFERRED EMBODIMENTS

Figure 1:
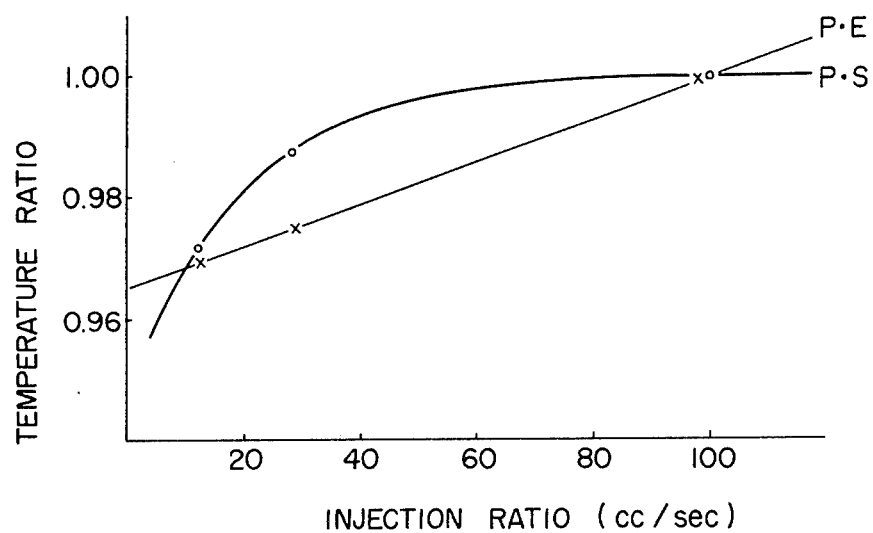
FIG. 1 is a graph showing the relationship between an injection ratio and a temperature ratio of polyethylene (PE) and polystyrene (PS)
Figure 2:
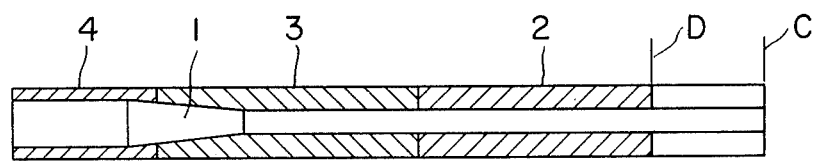
FIG. 2 shows a schematic longitudinal sectional view of a resin successively measured and fed in a heating cylinder.
Figure 3:
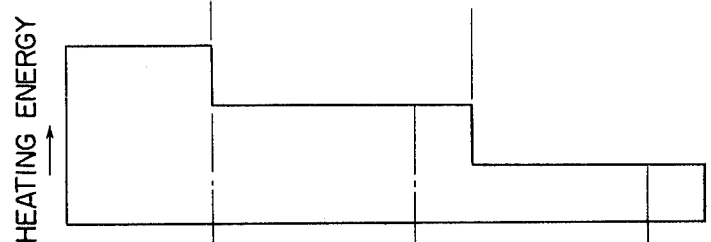
FIG. 3 is a graph showing the heat amount applied to the resin shown in FIG. 2.
Figure 4:
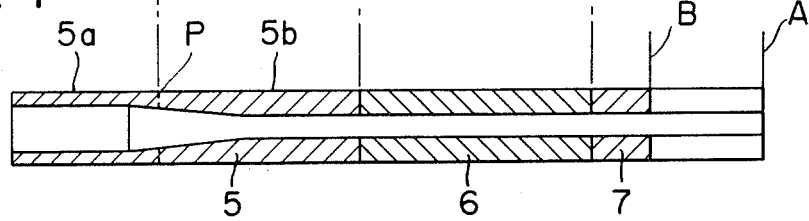
FIG. 4 is a schematic longitudinal sectional view showing portions of the resin to be successively fed into a cavity at the front end of the heating cylinder.

Referring to FIGS. 2 through 4, when it is assumed that a hopper were positioned at a position C at a time when an injection process has been completed and a screw 1 were moved backwardly over a stroke necessary for the next measuring process, the hopper is relatively moved to a position D. Reference numeral 2 represents the portion of the resin fed into the screw 1 in the present measuring process under the condition described above, numeral 3 is the portion of the resin in the measuring process before one molding cycle, and numeral 4 represents the portion of the resin in the measuring process before two molding cycles. The amount of heat applied to these portions of the resin in a heating cylinder is shown in FIG. 3.

On the other hand, the resin to be fed into a space formed at the front end of the heating cylinder will be explained in conjunction with FIG. 4. Reference numeral 5 shows the portion of the resin to be fed next time into the space and this resin portion 5 comprises two sections 5a and 5b which correspond respectively to the resin portion 4 and the resin portion 3 shown in FIG. 2. A resin portion 6 to be fed, after one molding cycle in the next molding cycle comprises a portion of the resin portion 3 and a part of the resin portion 2, and a resin portion 7 corresponding to the remaining part of portion 2 is fed after two molding cycles. The resin portions 5a and 5b have different temperatures as shown in FIG. 3, so that it is necessary to make uniform these temperatures when the resin portion 5 is injected so as to have the same viscosity. Namely, it is necessary to control the number of revolutions and/or back pressure of the screw 1 after the resin portion 5a has been plasticized so as to compensate for the difference in viscosities and the temperatures at a point P of the boundary between the portions 5a and 5b. Thereafter, the resin portion 5b is plasticized.

The boundary position P can be determined by the measuring stroke and the amount of the resin remaining in the heating cylinder after injection, i.e., cushion stroke. In a case where the number of revolutions and/or back pressure of the screw are controlled by a circuit to be described later when the point P is determined, the condition of the resin portion 5a is slightly affected by this control, but it will be soon plasticized so that it is subjected to less shearing force. The resin portion 5b, however, is successively subjected to a higher shearing force than the resin portion 5a at the time when the resin portion 5b is fed into the space at the front end of the heating cylinder.

Although in the above, the heating energy and its compensation were described graphically, actually it is necessary to compensate for the heating energy by taking into consideration the fact that the density of the resin varies in accordance with the advance of the resin in the heating cylinder.

Figure 5:
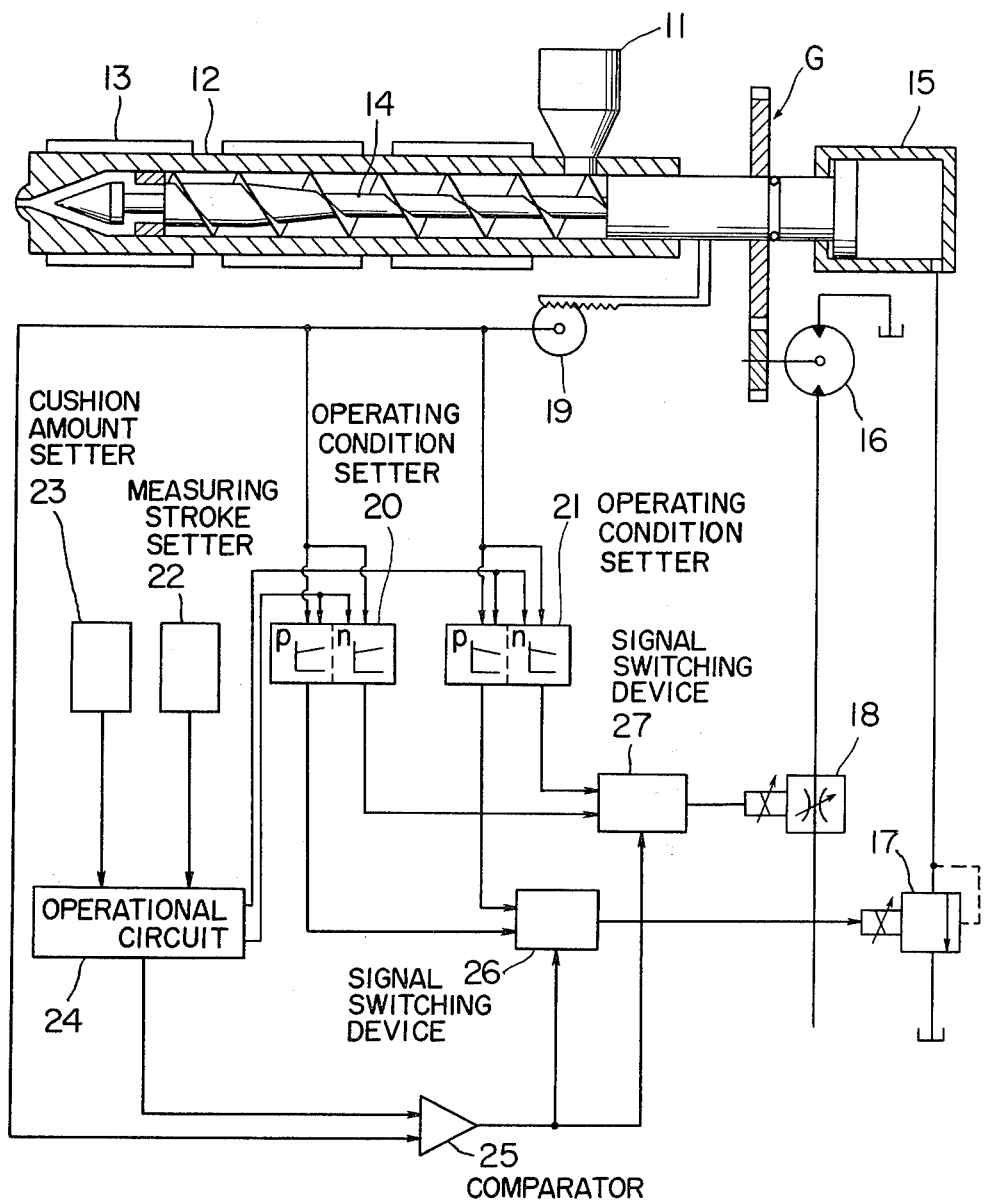
FIG. 5 shows a first embodiment according to this invention.

The first embodiment of this invention will now be described in more detail hereunder in conjunction with FIG. 5. Referring to FIG. 5, a raw material resin is fed into a heating cylinder 12 from a hopper 11 attached to the heating cylinder 12 of an in-line screw-type injection molding machine. The heating cylinder 12 is heated by a heater 13 mounted on the outer surface of the cylinder 12 and controlled by temperature adjusting means, not shown. Within the heating cylinder 12 is arranged a screw 14 which is reciprocated by means of a hydraulic cylinder 15 and rotated by a hydraulic motor 16. An electromagnetic proportional pressure control value 17 is connected to the hydraulic cylinder 15 for controlling the back pressure of the screw 14, and an electromagnetic proportional flow control value 18 is connected to the hydraulic motor 16 for adjusting oil amount used for driving the motor 16, which rotates the screw 14 through a gear train G. The position of the screw 14 is detected as an electric signal by a potentiometer 19 coupled to the screw 14. A measuring stroke setting device 22 and a cushion amount setting device 23 are set in accordance with a desired molded product, and an operational circuit 24 (which may be a microcomputor, for example, Z-80 sold by ZYLOG CO., LTD., U.S.A.) determines the position P according to the informations from the devices 22 and 23 on the basis of the following equations (1) and (2).

$$(B'/A') = N' + \alpha \text{ (see page 3)} \quad (1)$$

$$P = (CH - CU)\alpha + CU \quad (2)$$

where
B': Total Volume in Screw Channel,
A': Shot Volume,
CH: Cushion Stroke, and
CH: Charge Stroke (Plasticizing Complition Position) and these data are given to the operational circuit 24 by pushing, for example, numeric key board.

Predetermined data regarding the number of revolutions and the back pressure of the screw 14 are initially loaded in operating condition setting devices 20 and 21, respectively, and the device 20 stores data regarding the first step (5a) of the resin measuring process and the device 21 stores data concerning the second step (5b) thereof.

It will be considered that the operating condition setting device 20 or 21 comprises respectively two circuits regarding the back pressure and the number of revolutions of the screw 14 and only the circuit regarding the back pressure is now illustrated in FIG. 15 as a schematic circuit diagram.

Referring to FIG. 15, a pulse signal representing a position of the screw 14 from the potentiometer 19 is applied to a counter 100. A signal from the counter 100 is sent to a comparator 101 which compares this signal with a signal regarding increment of the screw position which is preliminarily set in the setting device 20(21).

Upon coincidence of these signals, a signal is generated from the comparator 101 and applied to an adder 102, to which are added a signal representing a start pressure of the screw at a time when it starts to operate and a signal representing increment of the pressure. Then, a signal from the adder 102 is sent to a signal switching device 26 as a signal regarding the back pressure of the screw. The start pressure and the increment of the pressure is fed back and applied to the adder 102 as a next start pressure.

Regarding the number of revolutions of the screw, substantially the same operation as described above is carried out by the setting device 20 (21) and a resulting signal is sent to the signal switching device 27. However, it is noted that in the devices 20 and 21, functions of the different increments of the pressure are stored with respect to the same increment of the screw position. A comparator 25 connected to the potentiometer 19 and the operational circuit 24 serves to compare the signal from the circuit 24 with the signal representing the screw position from the potentiometer 19 and when these signals coincide with each other, a signal is supplied from the comparator 25 to signal switching devices 26 and 27.

In the in-line screw-type injection molding machine described above, when the resin measuring process begins, the potentiometer 19 operates to detect the position of the screw 14 and continuously generates and sends a signal to the comparator 25. During the first step of the measuring process the condition of the resin is controlled by the data regarding the number of revolutions and the back pressure of the screw and stored in the setting device 20 until the signal from the potentiometer 19 coincides with the signal representing the position P which is determined by the operational circuit 24, but when the screw 14 reaches the position P, i.e., the signal from the potentiometer 19 coincides with the signal from the operational circuit 24, a signal is generated from the comparator 25 and this signal controls the signal switching devices 26 and 27. The number of revolutions and the back pressure of the screw 14 are then switched to the data stored in the device 21 regarding the second step of the measuring process, thus completing one measuring process. Therefore, the resin fed into the space at the front end of the heating cylinder 12 has been controlled so as to have a uniform temperature.

A second embodiment of this invention will be described hereunder in conjunction with FIGS. 6 through 9.

Figure 6:
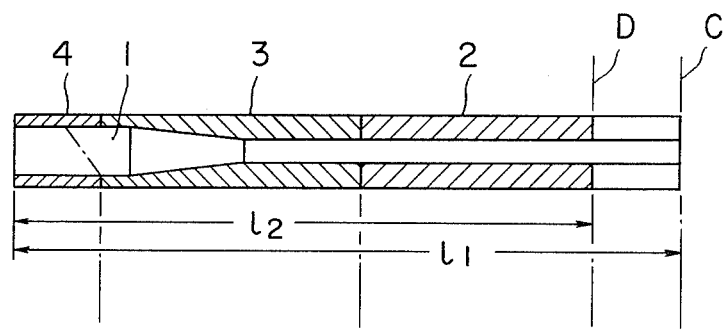
FIG. 6 shows a schematic longitudinal sectional view showing portions of a resin successively measured and fed in a heating cylinder, and also showing effective length of a screw in the heating cylinder.

FIG. 6 shows the same resin distribution in the heating cylinder of an injection molding machine as that shown in FIG. 2.

Figure 7:
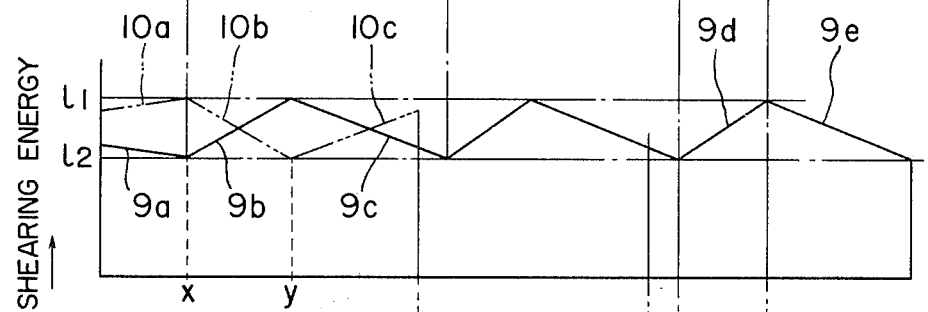
FIG. 7 is a graph showing the relationship between the effective length of the screw and the shearing energy applied to the resin.

After the measuring process has been completed and the hopper is positioned at a position D, the injection process begins and the screw 1 advances (leftwardly in FIG. 6) from the position D to C without rotating. At this time, although the resin is dropped into the barrel of the heating cylinder only by the weight thereof, the barrel between the positions D and C is rapidly filled with the resin when the next measuring process begins and the screw 1 begins to be rotated. The resin is then transferred forwardly until the measuring process is completed by the rotation of the screw 1. Therefore, the shearing energy applied to the resin fed into the space between the screw threads from the hopper at a time when the screw is backwardly moved is different from that applied at a time when the screw is rotated and begins to advance. FIG. 7 shows the distribution of the shearing energy successively applied to the resin during the process described above.

As described before, since the shearing energy applied to the resin is considered to be substantially proportional to the effective length of the screw and can be shown as a function of the effective length thereof, the shearing energy in the first step of one measuring process for a short time when the screw begins to rotate is changed as shown by a line 9d in FIG. 7 between the length $l_2$ (i.e., the moving distance of the resin from the position D to the space at the front end of the heating cylinder) and the length $l_1$ (i.e., the moving distance of the resin from the position C to the space). In the next or second step of the same measuring process, the shearing energy applied to the resin which is supplied from the hopper is shown by a line 9e in FIG. 7 during an interval in which the screw 1 is backwardly moved from the advanced position C (effective length $l_1$) to the retracted position D (effective length $l_2$). Consequently, the shearing energy applied to the resin fed from the hopper in one measuring process and accumulated in the space at the front end of the cylinder 12 through the space between the screw threads is shown by lines 9d and 9e in FIG. 7 and it can be readily noted that the shearing energy applied to the resin varies momentarily even in a single measuring process, thus changing the viscosity of the resin. A molded product made of the resin having non-uniform viscosity has such defects as flow marks, surface irregularity and nonuniform strength.

In a case where the entire resin measured by one measuring process is injected by one shot, although such problems as described above are solved only by uniformalizing the shearing energies in the first and second steps of one measuring process, the resin injected by one shot usually includes resin components fed into the space between the screw threads during different measuring processes. Generally, the distribution of the shearing energy of the resin injected by one shot is determined by the volume of the space between screw threads, the resin amount necessary for one injection and the measuring stroke.

Figure 8:
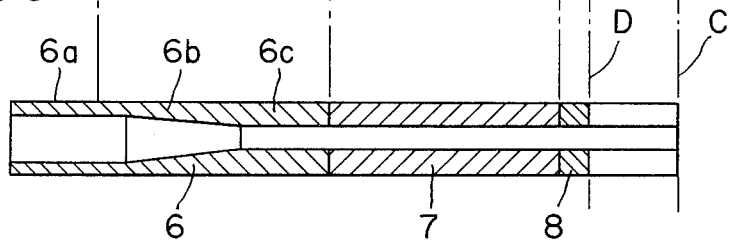
FIG. 8 is a schematic longitudinal sectional view showing portions of the resin to be successively fed into a cavity at the front end of the heating cylinder.

FIG. 8 shows the resin to be fed into the space formed at the front end of the heating cylinder 12, wherein reference numeral 6 shows a portion of the resin to be fed into the space in the next resin measuring process, numeral 7 shows a portion of the resin to be fed one cycle after the injection molding process, and numeral 8 shows a portion of the resin to be fed two molding cycles after. In this case, the resin 6 generally comprises a portion 6a which is a portion of the resin fed in the second step of the measuring process, one cycle preceding the present measuring process, a portion 6b fed in the first step of the present measuring process, and a portion 6c which is a portion of the resin fed in the second step of the same measuring process. The viscosity, i.e., shearing energy, of the resin 6 when it is supplied by one shot is shown in FIG. 7 by 9a, 9b and 9c. Therefore, in order to uniformalize the viscosity of the resin when it is fed into the space described above from the space between the screw threads, it is necessary to apply shearing energy to the resin as shown by lines 10a, 10b and 10c in FIG. 7 by changing the number of revolutions and the back pressure of the screw during the measuring process. The shearing energy applied to the resin during one measuring process can be obtained by measuring the measuring stroke and the resin remaining in the space of the heating cylinder after completion of one injection process, i.e., the cushion stroke. Thus, the amount of the resin in the first step of the measuring process is determined by the screw stroke necessary for one measuring process, and the amount of the resin in the second step is obtained by subtracting the amount of the resin in the first step from the amount of resin necessary for one injection process. Therefore, the shearing energy to be applied to the resin in the space between screw threads is determined by the conditions at a time when the raw material resin is supplied from the hopper into the space between screw threads, and the shearing energy is shown by lines 9d and 9e shown in FIG. 7. Accordingly, the compensation of the shearing energy can be automatically made by processing the measuring stroke and the cushion stroke described above by an operational circuit described later.

Although in the foregoings the shearing energy and its correction are described geometrically, actually it is necessary to correct the shearing energy by taking into consideration the fact that the density of the resin varies in accordance with the advance of the resin in the screw threads.

This embodiment will be described in more detail hereunder with reference to FIG. 9 in which elements and devices corresponding to those shown in FIG. 5 are designated by the same reference numerals. A measuring stroke setting device 30 and a cushion stroke setting device 31 (i.e., a device for setting the position of the screw 14 when the injection is completed) are provided for setting the measuring stroke and the cushion stroke in conformity with the product to be molded. An operational circuit 32 serves to calculate the variation of the shearing energy applied to the resin fed into a space at the front end of the heating cylinder by one measuring process in accordance with the values set by the measuring stroke setting device 30 and the cushion stroke setting device 31. The operational circuit 32 also serves to calculate the variation of the shearing energy (9a, 9b, or 9c in FIG. 7) remaining in the resin used for one molding shot based on the result calculated in the steps described above. To compensate for the variation of the shearing energy, the operational circuit 32 determines functions (10a, 10b and 10c in FIG. 7) regarding the shearing energies due to the rotation of the screw in the measuring process, i.e., the back pressure and the number of revolutions of the screw, and these functions are stored in operating condition setting devices 33 through 35 as first, second and third control functions, respectively.

Namely, the operational circuit 32 operates to determine positions x and y shown in FIG. 7 as follows:

$$x = (CH - CU)\alpha + CU \quad (3)$$

$$y = CH + (CH - CU)\alpha + (AV)/(A')(CH - CU) \quad (4)$$

where AV: screw channel volume from point D to C (FIG. 6). The circuit 32 further operates to determine the functions 10a, 10b, and 10c representing the shearing energy proportional to the effective length of the screw which varies from $l_2$ to $l_1$ as shown in FIG. 7. The shearing energy is represented by an equation $$SE = K \cdot El \quad (5)$$

where
SE: shearing energy;
El: effective length of screw; and
K: a constant determined by the screw used.

Thus, the shearing energy varies from $Kl_1$ to $Kl_2$. A gradient $K_1$ of the function 10b is shown as $$K_1 = \frac{Kl_2 - Kl_1}{y - x} \quad (6)$$

and gradients of the functions 10a and 10c are equal and shown as $$K_2 = \frac{Kl_1 - Kl_2}{CH - CU - (y - x)} \quad (7)$$

In a case where a screw position measured from the screw advance limit is represented by "$x_0$", SEa obtained from the function 10a is $$SEa = K_2 x_0 + Kl_1 - K_2 x = K_2(x_0 - x) + Kl_1$$

(e.g., $x_0 = x$; $SEa = Kl_1$). SEb obtained from the function 10b is $$SEb = K_1 x_0 + Kl_1 - K_1 x = K_1(x_0 - x) + Kl_1$$

(e.g., $x_0 = x$; $SEb = Kl_1$, and SEc obtained from the function 10c is $$SEc = K_2 x_0 + Kl_2 - K_2 y = K_2(x - y) + Kl_2$$

(e.g., $x = y$, $SEc = Kl_2$).

Memory circuits 36 and 37 are used to store positions x and y for switching the first function to the second function and the second function to the third function, respectively, the switching positions having been determined by the operational circuit 32. A comparator 38 compares the signal regarding the screw position detected by the potentiometer 19 with the signal from the operational circuit 32 through the memory circuits 36 or 37. When the value of the signal from the potentiometer 19 reaches the values stored in the memory circuits 36 and 37, the comparator 38 generates a signal and the signal switching devices 39 and 40 are operated by the magnitude of the output signal from the comparator 38 in accordance with the predetermined programs stored in the operating condition setters 33 through 35, thus controlling the number of revolutions and the back pressure of the screw. Each of the operating condition setting devices 33 through 35 has substantially the same construction as that of the setting device 20 or 21 shown in FIG. 5 and operates in substantially the same manner as that of the device 20 or 21. However, it is noted that in the respective devices 33 through 35, functions of the different increments of the pressure are stored with respect to the same increment of the screw position.

The invention arranged as described above operates as follows.

When a measuring process begins, the screw 14 moves backwardly and the variations of the position of the screw 14 is continuously detected as electrical signals. The signals are continuously sent to the comparator 38. Until the value of the signal from the potentiometer 19 reaches a value determined by the operational circuit 32 and set in the memory circuit 36, the electromagnetic proportional flow control valve 18 and the electromagnetic proportional pressure control valve 17 are controlled respectively by signals 41 and 42 regarding the number of revolutions and the back pressure of the screw 14 which are generated based on the first control function stored in the operating condition setting device 33.

When the value of the signal from the potentiometer 19 coincides with the value stored in the memory circuit 36, the comparator 38 operates so as to send signals to the signal switching devices 39 and 40, and the control valves 18 and 17 are then controlled by the second control function stored in the operating condition setting device 34. At the time when the value of the signal from the potentiometer 19 does not reach the value stored in the memory circuit 37, the control valves 18 and 17 are controlled by signals 43 and 44 regarding the number of revolutions and the back pressure, and when the signal value coincides with the value stored in the memory circuit 37, signals from the comparator 38 operate the signal switching devices 39 and 40 to switch the second control function stored in the operating condition setting device 34 to the third control function stored in the memory circuit 35, whereby the control valves 18 and 17 are controlled by signals 45 and 46 which are generated on the basis of the third function in the operating condition setting device 35.

Thus, the comparator 38 generates signals to operate the signal switching devices 39 and 40 together with the signals from the operating condition setting devices 33 through 35 for the back pressure and the number of revolutions of the screw in accordance with the signal regarding an increment of the position of the screw.

Upon completion of the measuring process including the steps described above, the shearing energy applied to the resin accumulated in the space at the front end of the heating cylinder has been compensated for and the resin will have entirely uniform temperature.

A third embodiment according to this invention will be described hereunder in conjunction with FIGS. 10 through 12, and this embodiment is proposed to obtain a uniform resin temperature after the melted resin is injected into the mold cavity.

Figure 10:
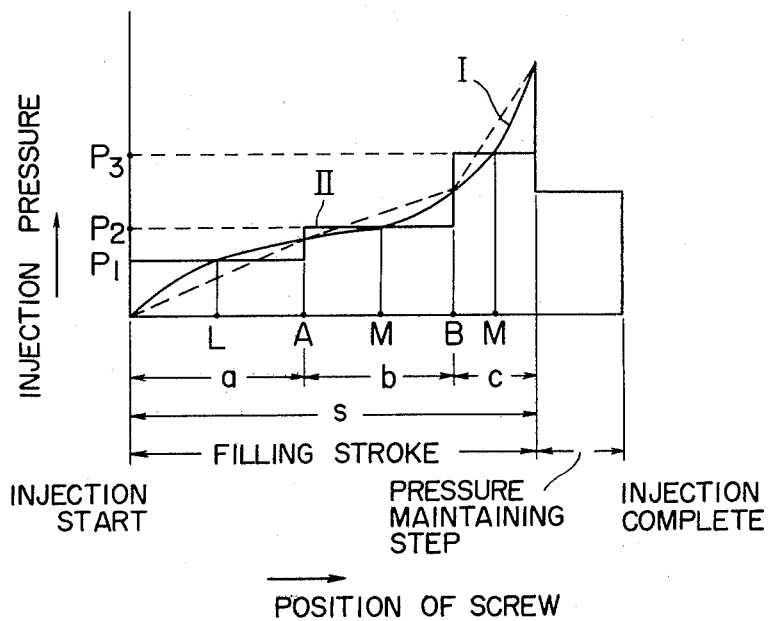
FIG. 10 is a graph showing the relationship between a position of a screw and an injection pressure in a resin filling process.

FIG. 10 shows a case in which a resin filling stroke S is divided into three regions a, b, and c at points A and B. Although the injection pressure during the filling stroke S varies as shown by a curve I in FIG. 10, this embodiment is constructed such that the injection pressure varies as a function of a stepped line II passing the middle points L, M and N of the regions a, b and c, respectively, and that the temperature of the melted resin changes in response to the heat amount in proportion to the graph II in the filling process. Of course, it is possible to represent the injection process as a function of a curve at the regions a, b and c.

Figure 9:
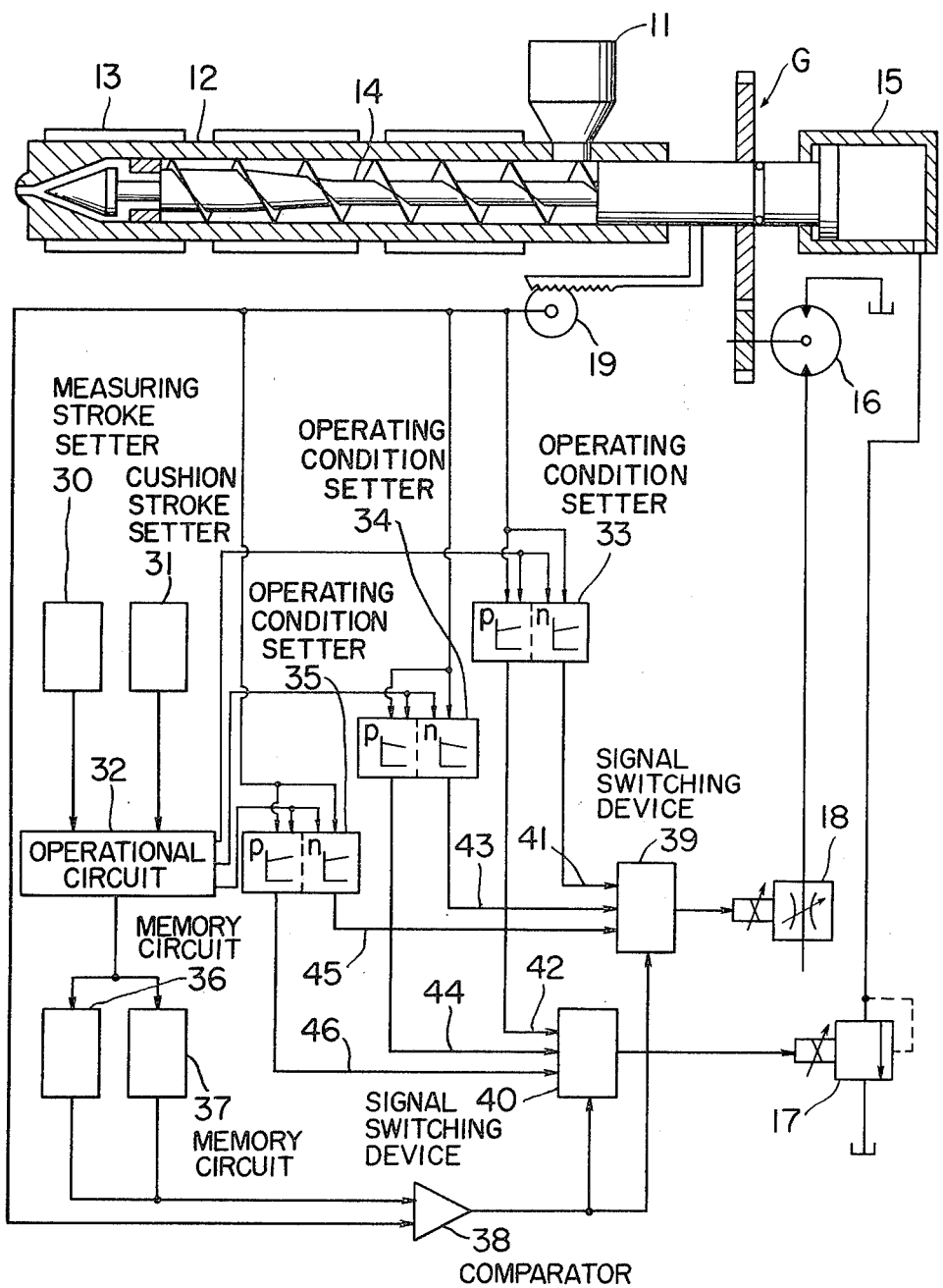
FIG. 9 shows a second embodiment according to this invention.
Figure 11:
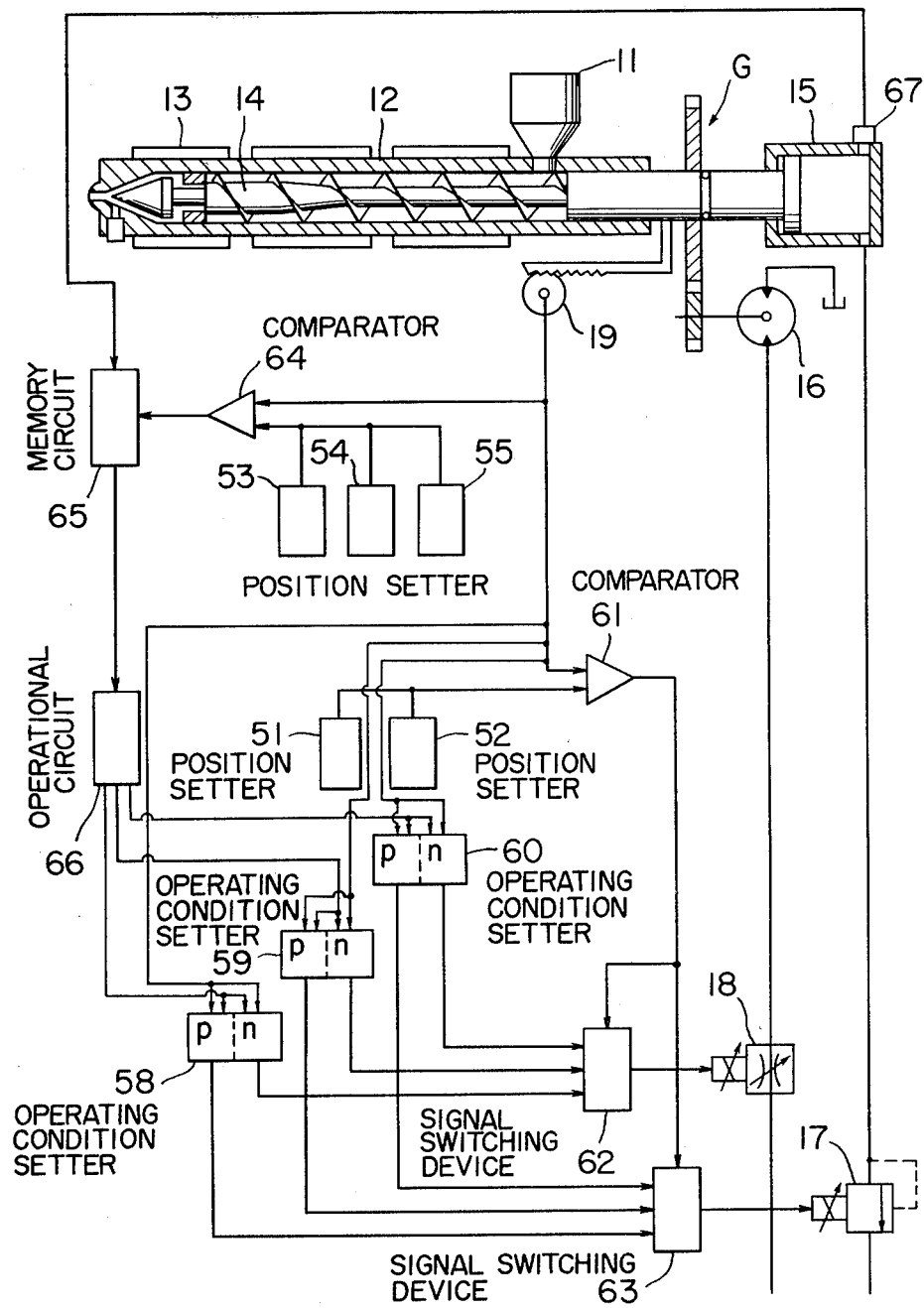
FIG. 11 shows a third embodiment according to this invention.

In FIG. 11, elements and devices corresponding to those shown in FIG. 5 or 9 are designated by the same reference numerals.

The dividing points A and B (FIG. 10) of the filling stroke S are set as electrical signals in dividing position setting devices 51 and 52. The injection pressures at the points L, M and N are set as electrical signals in pressure detecting position setting devices 53 through 55. Control signals regarding the number of revolutions and the back pressure of the screw 14, which are applied respectively to the electromagnetic proportional flow control valve 18 and the electromagnetic proportional pressure control valve 17, are set by operating condition setting devices 58 through 60. The setting devices 58 through 60 control the number of revolutions and the back pressure of the screw in the regions a, b and c, respectively as functions of the injection pressures in accordance with the backward movement of the screw in the measuring process.

Each of the operating condition setting devices 58 through 60 has substantially the same construction as that of the setting device 20 or 21 shown in FIG. 5 and operates in substantially the same manner as that of the device 20 or 21. However, it is noted that in the respective devices 58 through 60, functions of the different increments of the pressure are stored with respect to the same increment of the screw position.

A comparator 61 serves to compare the values of the signals generated by the potentiometer 19 with the values set in the position setting devices 51 and 52, and when the signal values coincide with the set values, signals which operate signal switching devices 62 and 63 are generated. The signal switching devices 62 and 63 serve to successively switch the values set in the operating condition setting devices 58 through 60 which operate the control valves 18 and 17 in accordance with the signals from the comparator 61. A comparator 64 serves to compare the values of the signals generated from the potentiometer 19 with the values set in the position setting devices 53 through 55, and when the signal values coincide with the set values, signals are sent to a memory circuit 65 which memorizes signals representing the positions L, M and N and the injection pressures $P_1$, $P_2$ and $P_3$ corresponding to these positions. The injection pressures $P_1$, $P_2$ and $P_3$ stored in the memory circuit 65 are sent to an operational circuit 66 upon completion of the filling process. The operational circuit 66 determines operating conditions, i.e., the number of revolutions and the back pressure of the screw in the regions c, b and a of the screw stroke S so that the temperature rise of the resin caused by the pressures $P_1$, $P_2$ and $P_3$ in the injection process is compensated for before the measuring process, and the decisions of the operational circuit 66 are sent to the operating condition setting devices 58 through 60 as functions of the pressures $P_1$, $P_2$ and $P_3$ and stored therein, respectively.

The injection pressure of the hydraulic cylinder means 15 is detected by a detector 67, which detects the injection pressures $P_1$, $P_2$ and $P_3$ at a time when the signal from the comparator 64 is applied to the memory circuit 65 and sends signals regarding the detected values to the memory circuit 65.

The arrangement of the above described embodiment operates as follows.

When the resin filling process begins, pressurized oil is admitted into the cylinder 15 to move the screw 14 leftwardly as viewed in FIG. 11. In response to the movement of the screw 14, the potentiometer 19 continuously detects the position of the screw 14 and sends a signal to the comparator 64. When the value of the signal from the potentiometer 19 coincides with the value set in the position setting device 53, the signal from the comparator 64 is applied to the memory circuit 65 to store the injection pressure $P_1$ detected by the detector 67 and the position L. In the same manner as described above, the injection pressures $P_2$ and $P_3$ and the positions L and M are stored in the memory circuit 65. These stored values are applied to the operational circuit 66 when the filling process has been completed. Then, the circuit 66 determines the operational conditions as functions of the injection pressures by taking into consideration the temperature rise of the melted resin caused by the injection pressure and these conditions are sent to the operating condition setting devices 58 through 60 as signals regarding the number of revolutions and the back pressure of the screw 14. In practice, the operational circuit 66 operates to determine the back pressure (BP) and the number of revolutions (N) of the screw as follows.

$$BP = \gamma_2(PE) \ (PE = \beta_1 - \alpha_1 P) \tag{10}$$

$$N = \gamma_2(NE) \ (NE = \beta_2 - \alpha_2 P) \tag{11}$$

where
- P: melt pressure;
- $\alpha_1$, $\alpha_2$, $\gamma_1$, and $\gamma_2$: constants determined by the resin used;
- $\beta_1$ and $\beta_2$: target total energy (i.e., total energy of generated energy and compensating energy);
- PE: compensating energy by screw back pressure; and
- NE: compensating energy by screw revolution number.

BP and NE thus obtained are set in the setting devices 58 through 60.

When the resin measuring process of the next molding cycle begins, the screw 14 moves backwardly through the regions c, b and a. During this backward movement of the screw 14, until the screw reaches the position B shown in FIG. 10, the electromagnetic proportional flow control valve 18 and the electromagnetic proportional pressure control valve 17 are controlled by the signal generated by the device 58 in which the operating condition is set in the region c of the measuring process, thereby determining the number of revolutions and the back pressure of the screw. In the successive steps, when the screw passes through the regions b and a and through the position A, the signal switching devices 62 and 63 switch the operating conditions, and the number of revolutions and the back pressure of the screw 14 in the regions b and a are controlled respectively by the set values of the setting devices 59 and 60. The number of revolutions and the back pressure of the screw are reduced as the screw moves backwardly through the regions c, b and a.

According to the steps described above, the resin fed into the space at the front end of the heating cylinder has a temperature distribution having a form inverse to that represented by the stepped line II shown in FIG. 10, but when the injection process is completed, the resin in the mold cavity has an entirely uniform temperature.

Figure 12:
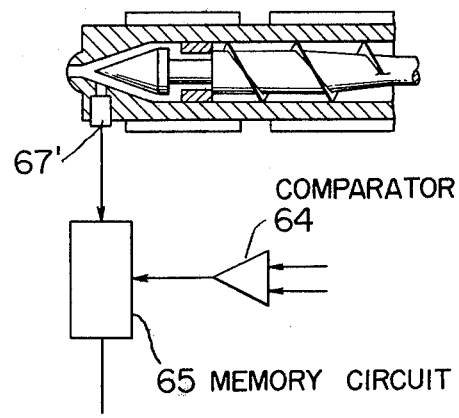
FIG. 12 shows a modification of the third embodiment shown in FIG. 11.

Although in the third embodiment, the injection pressure is detected by the detector 67 which is connected to the hydraulic cylinder 15, it may be possible to detect the resin pressure in the heating cylinder by connecting the detector 67′ to the position shown in FIG. 12.

A fourth embodiment of the invention will be described hereunder in conjunction with FIGS. 13 and 14, in which elements and devices corresponding to those shown in FIGS. 5, 9 and 11 are designated by the same reference numerals.

With this embodiment, the filling stroke S′ of the filling process is divided into four regions h, i, j and k at positions H, I and J and the filling speed is controlled in the respective regions.

Figure 13:
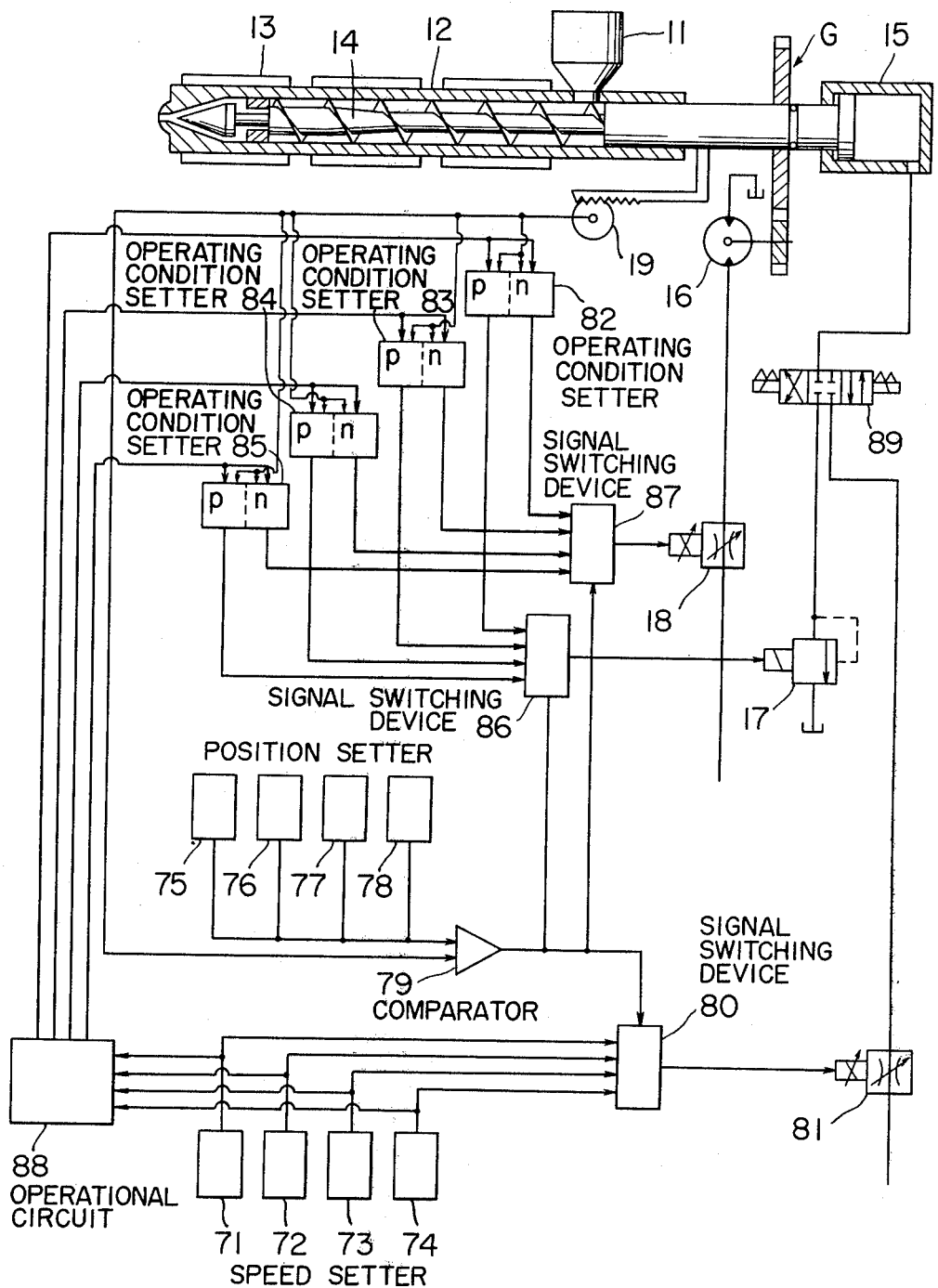
FIG. 13 shows a fourth embodiment according to this invention.
Figure 14:
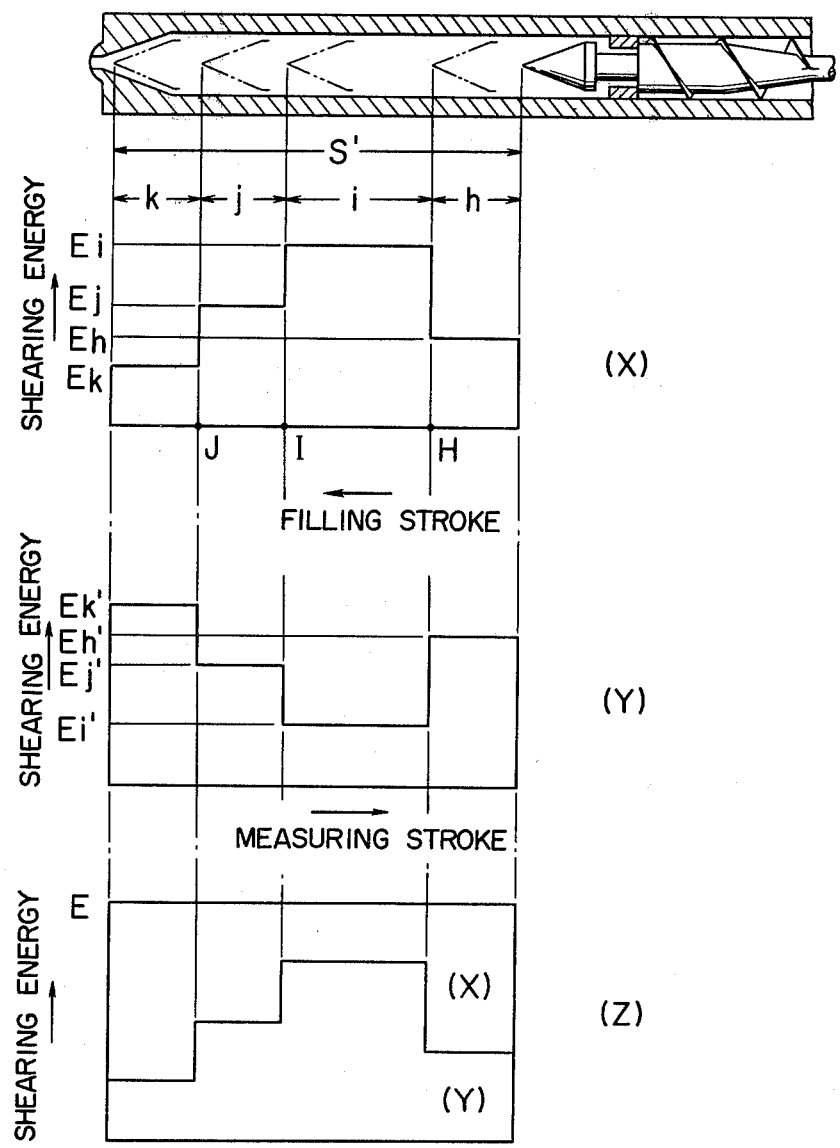
FIG. 14 is a graph showing the relationship between the positions of the screw and the shearing energies applied to the resin in the resin measuring and filling processes.

Referring to FIGS. 13 and 14, showing the controlling system as applied to an in-line screw-type injection molding machine, reference numerals 71 through 74 designate devices for setting filling speeds in which resin filling speeds are set as electric signals so that the screw 14 will move through the regions h, i, j and k at predetermined filling speeds, respectively. Switching points between the regions h, i, j and k and the final point of the stroke S′ are set by switching position setting devices 75 through 78. The comparator 79 serves to compare the value of a signal regarding the position of the screw 14 generated by the potentiometer 19 with the values set in the position setting devices 75 through 78 and when the signal value coincides with the set value, a signal is sent from the comparator 79 to the signal switching device 80 in the resin filling process and to the signal switching devices 86 and 87 in the resin measuring process. Namely, the comparator 79 operates such that in the resin filling process, every time when the signal from the potentiometer 19 coincides with that from the switching position setting device 75, 76 or 77, a signal regarding the resin filling speed is generated and sent to the signal switching device 80 so as to switch the speed setting devices 74 to 73, 73 to 72, and 72 to 71, successively, and in the resin measuring process, every time when the signal from the potentiometer 19 coincides with that from the position setting devices 75, 76, or 77, a signal is generated and sent to the signal switching device 86 to switch the operating condition setting devices 82 to 83, 83 to 84, and 84 to 85, and when the signal from the potentiometer 19 coincides with that from the position setting device 78, the resin measuring process is completed. Substantially the same description regarding the operation may be applicable to the signal switching device 87.

The signal switching device 80 switches signals from the speed setting devices 71 through 74 so as to operate an electromagnetic proportional flow control valve 81 which controls the moving speed of the screw 14 at a time when the device 80 receives signals from the comparator 79. Operating condition setting devices 82 through 85 establish the number of revolutions and the back pressure of the screw in the measuring process in the respective regions h, i, j and k which is set for controlling the filling speed.

The resin filling speed setting devices 71 through 74 are connected to the operating condition setting devices 82 through 85 through an operational circuit 88. The operational circuit 88 operates to calculate the shearing energy applied to the resin when the screw 14 moves throughout the regions h, i, j and k in the filling process and determines a control function regarding the number of revolutions and the back pressure of the screw 14 in the next measuring process so as to compensate for the non-uniformity of the shearing energy in the respective regions and to make uniform the shearing energy applied to the resin throughout one injection molding process. In practice, the operational circuit 88 operates to determine the screw back pressure (BP) and the screw revolution number (N) as follows.

$$BP = \gamma_3(PE') \ (PE' = \beta_3 - \alpha_3 V) \tag{12}$$

$$N = \gamma_4(NE') \ (NE' = \beta_4 - \alpha_4 V) \tag{13}$$

where
- V: filling velocity;
- $\alpha_3$, $\alpha_4$, $\gamma_3$ and $\gamma_4$: constants determined by the resin used;
- $\beta_3$ and $\beta_4$: target total energy (i.e. total energy of generated energy and compensating energy);
- PE′: compensating energy by screw back pressure; and NE': compensating energy by screw revolution number.

BP and N thus obtained are set in the setting devices 82 through 85. The signal from the comparator 79 is sent to the signal switching devices 86 and 87 so as to switch the values set in the operating condition setting devices 82 through 85 when the signal from the comparator 79 reaches these devices 86 and 87, thereby operating the electromagnetic proportional flow control valve 18 and pressure control valve 17 for respectively controlling the number of revolutions and the back pressure of the screw 14. Each of the operating condition setting devices 82 through 85 has substantially the same construction as that of the setting device 20 or 21 shown in FIG. 5 and operates in substantially the same manner so that of the device 20 or 21. However, it is to be noted that in the respective devices 82 through 85, functions of the different increment of pressure are stored with respect to the same increment of the screw position.

According to the arrangement described above, in the resin filling process, a change-over valve 89 is positioned at a position in which the pressurized oil passing through the control valve 81 is admitted into the hydraulic cylinder 15. The screw 14 has been stopped at the limit position of the backward movement of the filling stroke S' (righthand end in FIG. 14(X)) and the screw 14 then advances from this position to the position H through the region h, namely until the signal value detected by the potentiometer 19 coincides with the value set in the position setting device 75, at a filling speed set in the speed setting device 71. In this step, the resin in the heating cylinder 12 is subjected to shearing energy Eh in proportion to the filling speed. The screw 14 further advances through the regions i, j and k at speeds set in the speed setting devices 72 through 74, respectively, and in accordance with these speeds the electromagnetic proportional flow control valve 81 is controlled. In these steps, the resins in the respective regions of the heating cylinder 12 are subjected to shearing energies Ei, Ej and Ek and the temperature of the resin varies in proportion to the shearing energies.

The following steps are carried out to generate the shearing energy shown in FIG. 14 (Y).

In the measuring process, during the movement of the screw through the region k, until the signal value from the potentiometer 19 coincides with the value of the position signal setting device 78, the signal from the operating condition setting device 82 controls the electromagnetic proportional flow control valve 18 and pressure control valve 17 so as to obtain a predetermined number of revolutions and back pressure of the screw. Similarly when the screw 14 passes through the regions j, i and h, the switching devices 86 and 87 are switched successively in response to the coincidence of the signal values from the potentiometer 19 with the values of the position signal setting devices 77, 76 and 75, and the signals from the operating condition setting devices 83, 84 and 85 operate the control valves 18 and 17, thereby controlling the number of revolutions and the back pressure so as to take predetermined values.

After completing the filling process and the successive process for maintaining a suitable pressure in the mold after feeding the resin in the mold cavity (these two processes are called an injection process), the measuring process in the next injection molding cycle begins. In this measuring process, the number of revolutions and the back pressure of the screw are controlled beforehand so as to apply to the resin the shearing energies which are inversely proportional to the shearing energies to be applied to the resin in the filling process as shown in FIG. 14 (Y) by taking the temperature rise of the resin in the filling process into consideration. Consequently, the shearing energy to be applied to the resin in the measuring process and the subsequent filling process becomes uniform throughout the regions h, i, j and k as shown in FIG. 14 (Z), thereby again uniformly controlling the temperature of the resin.

What is claimed is:

1. In an apparatus for controlling a plasticizing process of a resin of an in-line screw-type injection molding machine of the type in which the number of revolutions and the back pressure of a screw disposed in a heating cylinder of the injection molding machine are controlled during the resin plasticizing process and comprising hydraulic means for reciprocating and rotating said screw, means for detecting a process variable which represents a position of the screw during the plasticizing process, memory means in which are set programs regarding the number of revolutions and the back pressure of the screw in first and second steps of a resin measuring process, and an operation controller responsive to the output of said detecting means for controlling and determining a control function regarding an operating condition for uniformarizing the resin to be injected so as to compensate for the distribution of the temperature of the resin, the improvement which comprises a measuring stroke setting device and a cushion amount setting device which are set in accordance with the quantity of a product to be formed, an operational circuit for determining the point between said first and second steps from values set in said measuring stroke setting device and said cushion amount setting device, a comparator which compares an output signal from said operational circuit with that from said detecting means, and switching means which are operated by an output signal from said comparator for controlling said hydraulic means in accordance with the predetermined programs stored in said memory means thereby to control the number of revolutions and the back pressure of the screw.

2. The apparatus according to claim 1, wherein said operational circuit operates to determine a variation of a shearing energy to be applied to the resin and control functions regarding the number of revolutions and the back pressure of the screw for compensating for said variation of the shearing energy, and the apparatus further comprises memory circuits interposed between said operational circuit and said comparator for memorizing positions to switch said control functions instructed by said operational circuit.

3. In an apparatus for controlling a plasticizing process of a resin of an in-line screw-type injection molding machine of the type in which the number of revolutions and the back pressure of a screw disposed in a heating cylinder of the injection molding machine are controlled during the resin plasticizing process and comprising hydraulic means for reciprocating and rotating said screw, means for detecting a process variable which represents a position of the screw during the plasticizing process, memory means in which are set programs regarding the number of revolutions and the back pressure of the screw in first and second steps of a resin measuring process, and an operation controller responsive to the output of said detecting means for controlling and determining a control function regarding an operating condition for uniformizing the resin to be injected so as to compensate for the distribution of the temperature of the resin, the improvement which comprises means for setting positions at which a resin filling stroke is divided, means for setting positions at which injection pressures at the divided regions are detected, a first comparator which compares an output signal from said detecting means with that from said means for setting injection pressure detecting position, a memory circuit for memorizing an output signal from said first comparator and an injection pressure at said divided position, an operational circuit which determines a control function based on an output signal from said memory circuit and generates a signal which is selectively applied to said memory means, a second comparator which compares an output signal from said detecting means with that from said dividing position setting means, and switching means which are operated by an output signal from said second comparator for controlling said hydraulic means in accordance with the predetermined programs stored in said memory means thereby to control the number of revolutions and the back pressure of the screw.

4. In an apparatus for controlling a plasticizing process of a resin of an in-line screw-type injection molding machine of the type in which the number of revolutions and the back pressure of a screw disposed in a heating cylinder of the injection molding machine are controlled during the resin plasticizing process and comprising hydraulic means for reciprocating and rotating said screw, means for detecting a process variable which represents a position of the screw during the plasticizing process, memory means in which are set programs regarding the number of revolutions and the back pressure of the screw in first and second steps of a resin measuring process, and an operation controller responsive to the output of said detecting means for controlling and determining a control function regarding an operating condition for the distribution of the temperature of the resin, the improvement which comprises means for setting resin filling speeds at respective divided regions of a filling stroke, respectively, means for setting positions to sequentially switch said filling speeds, an operational circuit which determines a variation of a shearing force energy applied to the resin in the resin filling process, determines a control function to compensate for said variation of the shearing energy, and generates signals applied to said memory means, respectively, a comparator which compares an output signal from said detecting means with that from said switching position setting means, first switching means which are operated by an output signal from said comparator for controlling said hydraulic means in accordance with predetermined programs stored in said memory means, and second switching means which is operated by an output signal from said comparator in accordance with output signals from said filling speed setting means, thus controlling said hydraulic means thereby to control the number of revolutions and the back pressure of the screw.

5. The apparatus according to claim 1, 2, 3 or 4 wherein each of said memory means for setting programs regarding the number of revolutions and the back pressure of the screw comprises a counter electrically connected to said process variable detecting means, a comparator connected to said counter, an adder connected to said comparator, the output of said adder being connected to said switching means for controlling said hydraulic means in accordance with the predetermined programs stored.

* * * * *